United States Patent
Chang

(10) Patent No.: US 7,740,383 B2
(45) Date of Patent: Jun. 22, 2010

(54) TWO-LAYERED OPTICAL PLATE INCLUDING SKEWED MICRO-DEPRESSION MATRIX

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/875,959

(22) Filed: Oct. 22, 2007

(65) Prior Publication Data
US 2009/0027898 A1 Jan. 29, 2009

(30) Foreign Application Priority Data
Jul. 26, 2007 (CN) .......................... 200710201174

(51) Int. Cl.
*F21V 5/00* (2006.01)
(52) U.S. Cl. .................. 362/338; 362/330; 362/339; 362/558; 362/620
(58) Field of Classification Search ......... 362/617–620, 362/338–340, 26, 29, 30, 330–333, 606, 362/607, 627, 628, 558, 616; 385/146; 359/831, 359/837, 599
See application file for complete search history.

(56) References Cited

U.S. PATENT DOCUMENTS

| 6,700,707 B2 * | 3/2004 | Kashima et al. ............. 359/599 |
| 6,752,505 B2 * | 6/2004 | Parker et al. ................ 362/627 |
| 2006/0256582 A1 * | 11/2006 | Chuang ....................... 362/620 |
| 2007/0229958 A1 * | 10/2007 | Mai ............................ 359/599 |
| 2008/0117515 A1 * | 5/2008 | Hsu et al. ................... 359/599 |
| 2008/0117516 A1 * | 5/2008 | Hsu et al. ................... 359/599 |

FOREIGN PATENT DOCUMENTS

| JP | 8-001714 A | 1/1996 |
| JP | 2004348000 A | * 12/2004 |

OTHER PUBLICATIONS

English Abstract of Japanese Publication JP 2004348000 A.*

* cited by examiner

*Primary Examiner*—Jong-Suk (James) Lee
*Assistant Examiner*—Kevin J. Spinella
(74) *Attorney, Agent, or Firm*—Frank R. Niranjan

(57) ABSTRACT

An exemplary optical plate includes a transparent layer and a light diffusion layer. The transparent layer includes a light input interface, a light output surface opposite to the light input interface, and a plurality of micro-depressions formed on the light output surface. The micro-depressions are arranged along a plurality of imaginary, separate, circular arcs. Each micro-depression has at least three side surfaces connected to each other, and a transverse width of each side surface increases along a direction away from the light diffusion layer. The light diffusion layer is integrally formed in immediate contact with the light input interface of the transparent layer, and free of air or gas pockets trapped in an interface therebetween. The light diffusion layer includes a transparent matrix resin and a plurality of diffusion particles dispersed in the transparent matrix resin.

10 Claims, 5 Drawing Sheets

TWO-LAYERED OPTICAL PLATE INCLUDING SKEWED MICRO-DEPRESSION MATRIX

CROSS-REFERENCE TO RELATED APPLICATIONS

This application is related to a copending U.S. patent application, which is application Ser. No. 11/875,958 filed on Oct. 22, 2007, and entitled "TWO-LAYERED OPTICAL PLATE". In the copending application, the inventor is Shao-Han Chang. The copending application has the same assignee as the present application. The disclosures of the above identified application are incorporated herein by reference.

BACKGROUND OF THE INVENTION

1. Field of the Invention

The present invention generally relates to optical plates, and more particularly to an optical plate for use in, for example, a liquid crystal display (LCD).

2. Discussion of the Related Art

The weight and thinness of LCD panels make them suitable for a wide variety of uses in electronic devices such as personal digital assistants (PDAs), mobile phones, portable personal computers, and other electronic appliances. Liquid crystal is a substance that does not illuminate light by itself. Instead, the liquid crystal relies on light received from a light source in order for the liquid crystal to display information. In a typical liquid crystal display device, a backlight module powered by electricity supplies the needed light.

FIG. 5 is a cross-section of an exploded side view of a typical backlight module 10 employing a typical optical diffusion plate. The backlight module 10 includes a housing 11, a plurality of lamps 12 disposed in the housing 11, a light diffusion plate 13 and a prism sheet 14. The light diffusion plate 13 and the prism sheet 14 are stacked on the housing 11 in that order. The lamps 12 emit light, and the inside walls of the housing 11 are configured for reflecting some of the light upwards. The light diffusion plate 13 includes a plurality of embedded dispersion particles. The dispersion particles are configured for scattering received light, and thereby enhancing the uniformity of light that exits the light diffusion plate 13. The prism sheet 14 includes a plurality of V-shaped structures on a top thereof. The V-shaped structures are configured for collimating, to a certain extent, the received light.

In use, light emitted from the lamps 12 enters the prism sheet 14 after being scattered in the diffusion plate 13. The light is refracted by the V-shaped structures of the prism sheet 14 and is thereby concentrated, so that a brightness of light illumination is increased. Finally, the light propagates into an LCD panel (not shown) disposed above the prism sheet 14. The brightness of light illumination may be improved by the V-shaped structures of the prism sheet 14, but the viewing angle may be narrow. In addition, although the diffusion plate 13 and the prism sheet 14 are in contact with each other, a plurality of air pockets still exists at the boundary therebetween. When the backlight module 10 is in use, light passes through the air pockets, and some of the light undergoes total reflection at one or another of the corresponding boundary. As a result, the light energy utilization ratio of the backlight module 10 is reduced.

Therefore, a new optical means is desired in order to overcome the above-described shortcomings.

SUMMARY

An optical plate according to a preferred embodiment includes a transparent layer and a light diffusion layer. The transparent layer includes a light input interface, a light output surface opposite to the light input interface, and a plurality of micro-depressions formed on the light output surface. The micro-depressions are arranged in a skewed matrix. The skewed matrix includes curved rows and curved columns. Each micro-depression has at least three side surfaces connected to each other, and a transverse width of each side surface increases along a direction away from the light diffusion layer. The light diffusion layer is integrally formed in immediate contact with the light input interface of the transparent layer, and free of air or gas pockets trapped in an interface therebetween. The light diffusion layer includes a transparent matrix resin and a plurality of diffusion particles dispersed in the transparent matrix resin.

Other advantages and novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating principles of the present optical plate and method. Moreover, in the drawings, like reference numerals designate corresponding parts throughout several views, and all the views are schematic.

DETAILED DESCRIPTION OF THE EMBODIMENTS

Reference will now be made to the drawings to describe preferred embodiments of the present optical plate and method for making the optical plate, in detail.

Figure 1:
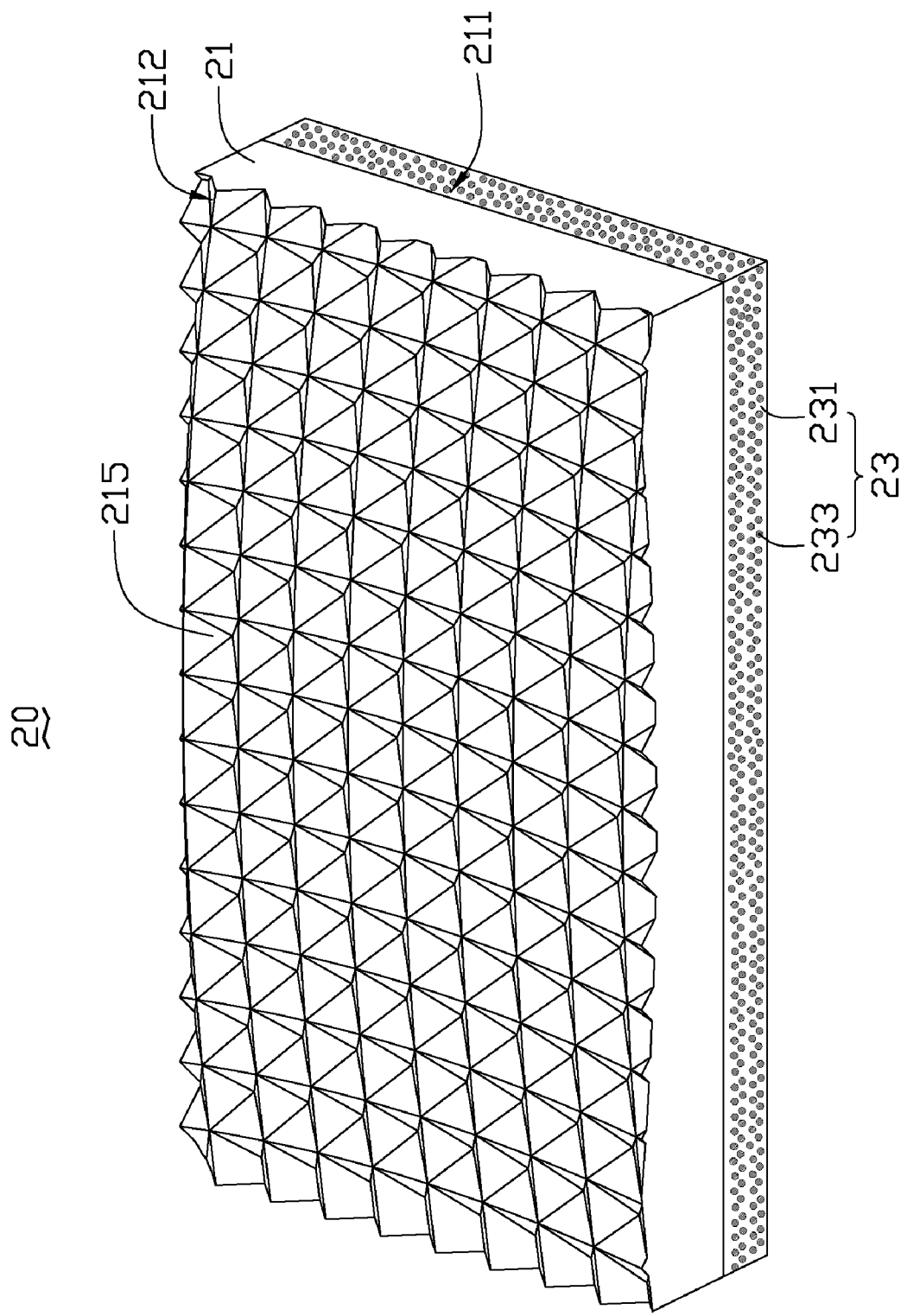
FIG. 1 is an isometric view of an optical plate in accordance with a first embodiment of the present invention.
Figure 2:
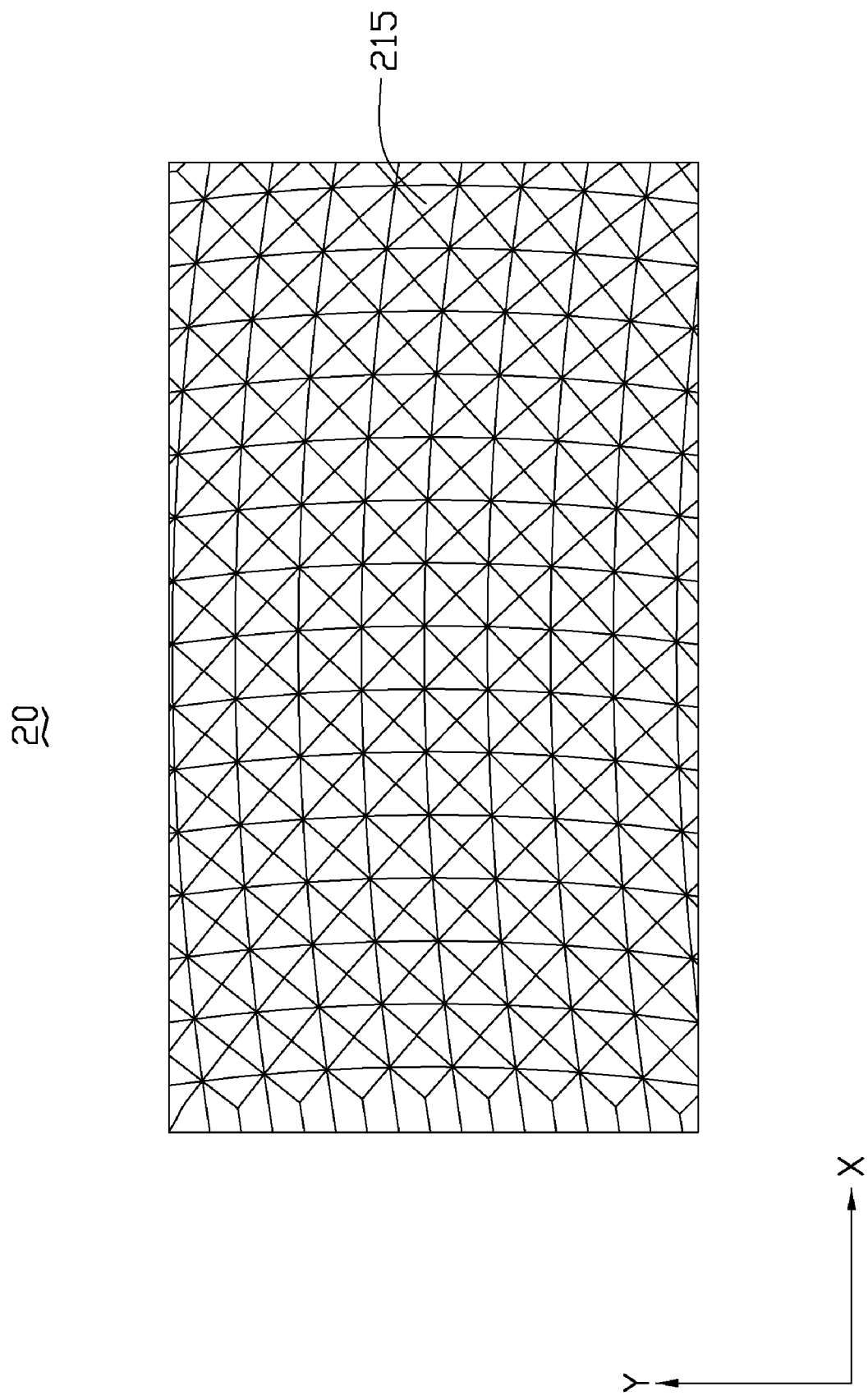
FIG. 2 is a top plan view of the optical plate shown in FIG. 1.

Referring to FIGS. 1 and 2, an optical plate 20 according to a first embodiment is shown. The optical plate 20 includes a transparent layer 21 and a light diffusion layer 23. The transparent layer 21 and the light diffusion layer 23 are integrally formed. That is, the transparent layer 21 and light diffusion layer 23 are in contact with each other at a common interface between them. The transparent layer 21 includes a light input interface 211, a light output surface 212, and a plurality of depressions 215. The light input interface 211 and the light output surface 212 are on opposite sides of the transparent layer 21. The depressions 215 are formed in the light output surface 212 of the transparent layer 21. The light diffusion layer 23 is adjacent to the light input interface 211 of the transparent layer 21. The micro-depressions 215 are arranged in a skewed matrix manner. In this embodiment, the micro-depressions 215 are rectangular pyramidal depressions.

Each row of the micro-depressions 215 extends along an imaginary circular arc. The imaginary circular arcs have a same curvature, and centers of the imaginary circular arcs are aligned apart in a line perpendicular to an X-axis. Each of the micro-depressions 215 is formed according to the skewed matrix, thus a size, a shape, and a position of each of the micro-depressions 215 correspond to rows and columns of the skewed matrix. In the first embodiment, the micro-depressions 215 have a same shape and a same size. Furthermore, as seen in FIG. 2 each row and each column of the matrix is curved. In the first embodiment, curvatures of the rows of the matrix are the same.

The transparent layer 21 can be made of one or more transparent matrix resins selected from the group including polyacrylic acid (PAA), polycarbonate (PC), polystyrene (PS), polymethyl methacrylate (PMMA), methylmethacrylate and styrene (MS), and so on. A thickness of the transparent layer 21 and a thickness of the light diffusion layer 23 can both be equal to or larger than about 0.35 millimeters. In the first embodiment, a value of the combined thickness of the transparent layer 21 and the light diffusion layer 23 can be in the range from about 1 millimeter to about 6 millimeters.

The micro-depressions 215 are configured for collimating light exiting the optical plate 20, thereby improving the brightness of light illumination. In the first embodiment, a pitch between adjacent micro-depressions 215 either in the X-direction or a Y-direction, is configured to be in a range from about 0.025 millimeters to about 1 millimeter. A vertex angle θ of each micro-depression 215 is configured to be in the range from about 60 degrees to about 120 degrees.

The light diffusion layer 23 is configured for enhancing optical uniformity. The light diffusion layer 23 includes a transparent matrix resin 231 and a plurality of diffusion particles 233 dispersed in the transparent matrix resin 231. The transparent matrix resin 231 can be one or more materials selected from the group consisting of polyacrylic acid (PAA), polycarbonate (PC), polystyrene (PS), polymethyl methacrylate (PMMA), methylmethacrylate and styrene (MS), and any suitable combination thereof. The diffusion particles 233 can be made of material(s) selected from the group consisting of titanium dioxide, silicon dioxide, acrylic resin, and any combination thereof. The diffusion particles 233 are configured for scattering light and enhancing the light distribution capability of the light diffusion layer 23.

When the optical plate 20 is employed in a typical backlight module, light emitted from light sources (not shown) of the backlight module enters the light diffusion layer 23 of the optical plate 20. The light is substantially diffused in the light diffusion layer 23. Subsequently, most of the light is condensed by the micro-depressions 215 of the transparent layer 21 when exiting the light output surface 212. As a result, a brightness of the backlight module is increased. In addition, because the arrangement of the micro-depressions 215 are aligned obliquely with the LCD pixels either in the X-direction or the Y-direction, the typical backlight module employing the optical plate 20 will have little to no moire pattern interference between the optical plate 20 and the pixel pitch of LCD panel.

Furthermore, because the transparent layer 21 and the light diffusion layer 23 are integrally formed together by multi-shot injection molding, the optical plate 20 has no air or gas pockets trapped between the transparent layer 21 and the light diffusion layer 23. Since, there are no air or gas pockets, an efficiency of light utilization of backlight module employing the optical plate 20 is high. The optical plate 20 replaces a conventional combination of a diffusion plate and a prism sheet used in the module, thus, simplifying the assembly process of the backlight module is simplified. Also, an occupying space needed by the optical plate 20 is generally less than that of the combination of a diffusion plate and a prism sheet. Therefore, the total volume of the backlight module is reduced. Still further, employing the optical plate 20 in the module instead of the combination of two optical plates/sheets reduces costs.

In an alternative embodiment, the micro-depressions 215 can be arranged along a plurality of imaginary, separate, circular arcs having a same radius. Centers of circles defined by the circular arcs are aligned in a straight line along the Y-direction Preferably, the centers are arranged apart in a constant distance to design two adjacent arrays of the micro-depressions 215 aligned side by side.

Figure 3:
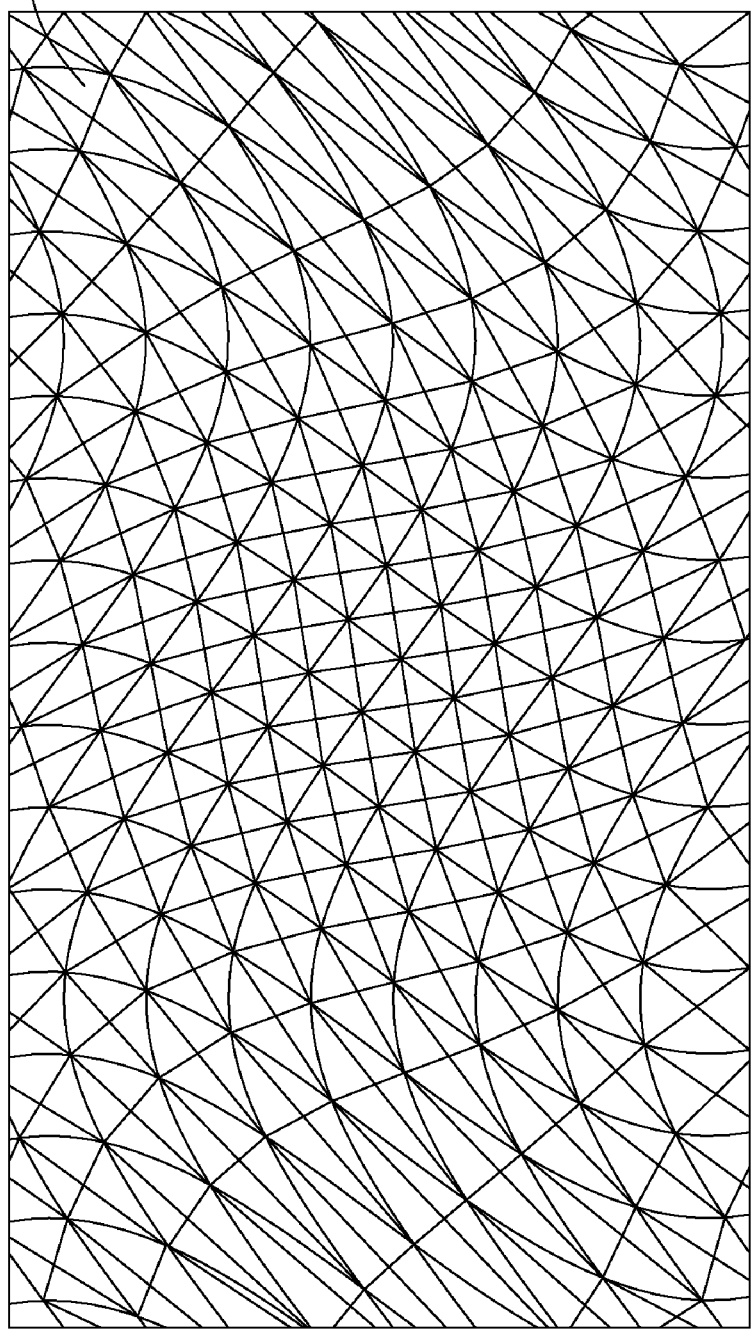
FIG. 3 is a top plan view of an optical plate in accordance with a second embodiment of the present invention.

Referring to FIG. 3, an optical plate 30 in accordance with a second preferred embodiment is shown. The optical plate 30 is similar in principle to the optical plate 20. The micro-depressions 315 of the optical plate 30 are arranged in a skewed matrix having rows and columns. However, either each row or each column of the micro-depressions 315 extends along a predetermined S-shaped curve, and the micro-depressions 315 are different.

Figure 4:
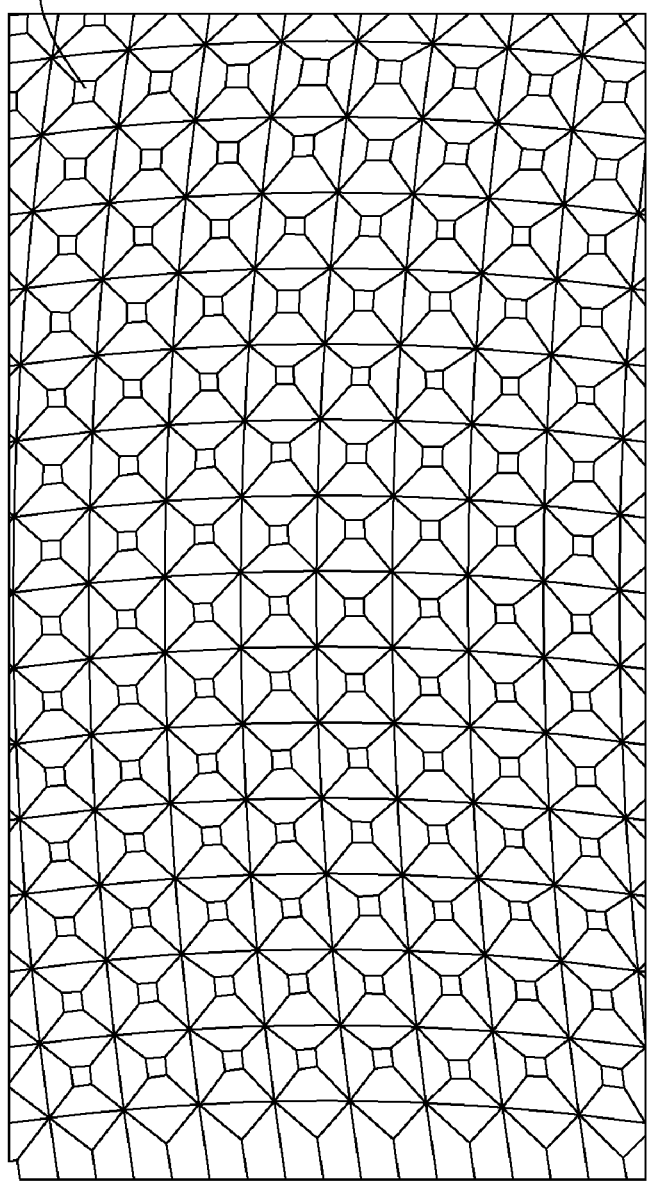
FIG. 4 is a top plan view of an optical plate in accordance with a third embodiment of the present invention.
Figure 5:
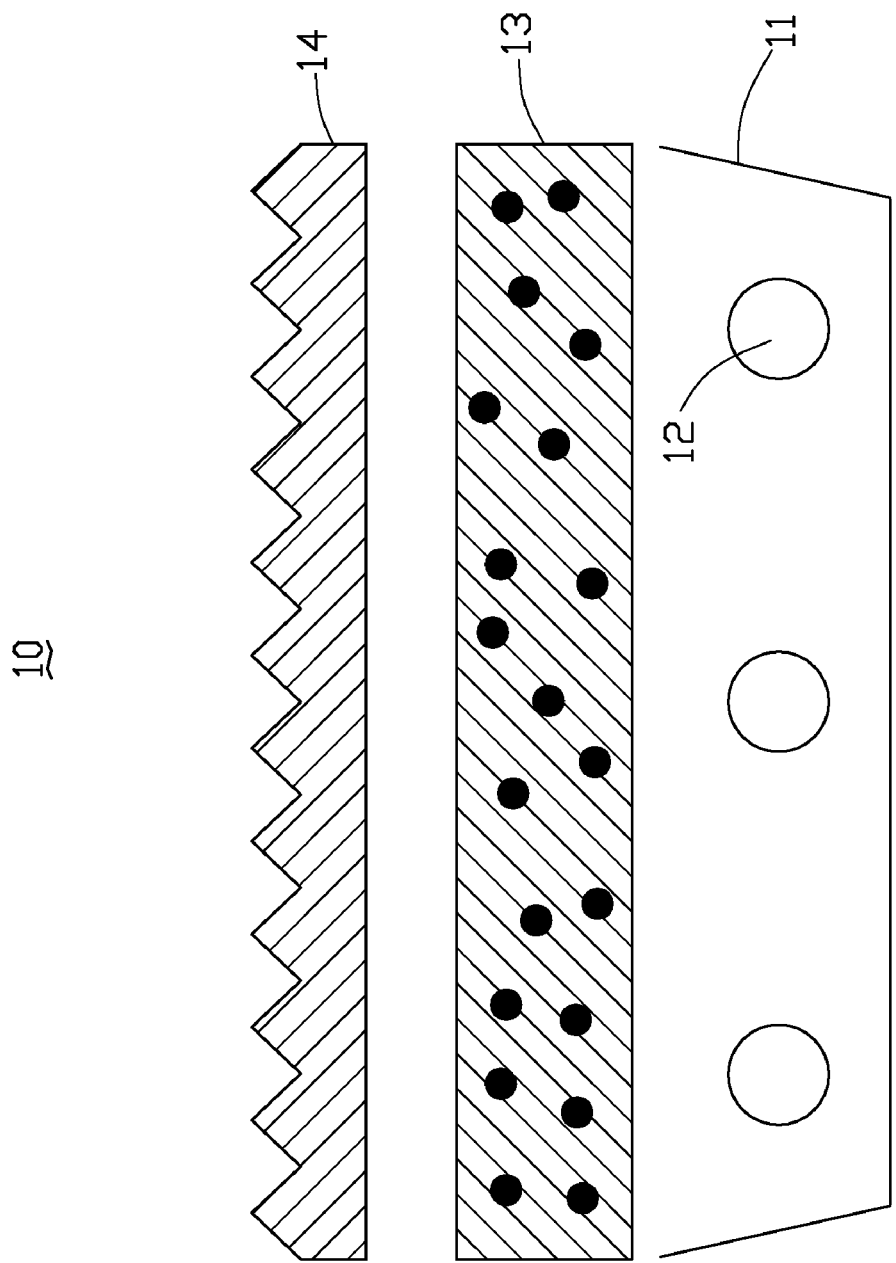
FIG. 5 is an exploded, side cross-sectional view of a conventional backlight module.

Referring to FIG. 4, an optical plate 40 in accordance with a third preferred embodiment is shown. The optical plate 40 is similar in principle to the optical plate 20 of the first embodiment. However, each of micro-depressions 415 of the optical plate has a configuration of a frustum of a four-sided pyramid-like structure. The micro-depression 415 includes four side surfaces (not labeled) and a bottom surface (not labeled).

It should be noted that the scope of the present optical plate is not limited to the above-described embodiments. In particular, even though specific shapes of micro-depressions have been described and illustrated, the micro-depressions can have various other suitable shapes. For example, the micro-depressions can be three-sided (triangular) pyramidal depressions, four-sided (rectangular) pyramidal depressions, five-sided (pentagonal) pyramidal depressions, multi-sided (polygonal) pyramidal depressions, or frustums of these.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical plate, comprising:
   a transparent layer including a light input interface, a light output surface opposite to the light input interface, and a plurality of micro-depressions formed on the light output surface and arranged in a skewed matrix, wherein the skewed matrix comprises rows and columns, the rows and columns extending along curved imaginary lines in a plane parallel to the light output surface, respectively, and each micro-depression has a shape that follows a contour of the skewed matrix, the micro-depressions have different shapes; and
   a light diffusion layer integrally formed in immediate contact with the light input interface of the transparent layer, and free of air or gas pockets trapped in an interface therebetween, the light diffusion layer including a transparent matrix resin and a plurality of diffusion particles dispersed in the transparent matrix resin, wherein each micro-depression has at least three side surfaces connected to each other, and a transverse width of each side surface increases along a direction away from the light diffusion layer.

2. The optical plate as claimed in claim 1, wherein each curved row extends along an imaginary circular arc, and the micro-depressions aligned along each curved row.

3. The optical plate as claimed in claim 2, wherein the imaginary circular arcs of each row have a same curvature, and centers of the imaginary circular arcs are aligned apart in a line.

4. The optical plate as claimed in claim 1, wherein each of the curved rows or curved columns extend along a predetermined S-shaped curve, and the micro-depressions aligned along each curved row or each curved column.

5. The optical plate as claimed in claim 1, wherein a pitch of adjacent two micro-depressions is in a range from about 0.025 millimeters to about 1 millimeter.

6. The optical plate as claimed in claim 1, wherein the micro-depressions are shaped in a form selected from the group consisting of four-sided pyramidal depressions, frustums of four-sided pyramidal depressions, four-sided pyramid-like depressions, and frustums of four-sided pyramid-like depressions.

7. The optical plate as claimed in claim 6, wherein for each four-sided pyramidal depression and each frustum of a four-sided pyramidal depression, a first pair of opposite sides defines a first dihedral angle, a second pair of opposite sides defines a second dihedral angle, and each of the first and second dihedral angles is in the range from about 60 degrees to about 120 degrees.

8. The optical plate as claimed in claim 1, wherein a thickness of the transparent layer and a thickness of the light diffusion layer are both greater than 0.35 millimeter respectively.

9. The optical plate as claimed in claim 1, wherein the transparent matrix resin is selected from one or more materials consisting of polyacrylic acid, polycarbonate, polystyrene, polymethyl methacrylate, methylmethacrylate and styrene, and any combination thereof.

10. The optical plate as claimed in claim 1, wherein the diffusion particles are made of one or more materials selected from the group consisting of titanium dioxide, silicon dioxide, acrylic resin, and any combination thereof.

* * * * *